United States Patent [19]

Fage

[11] 4,422,605
[45] Dec. 27, 1983

[54] REVERSER FOR JET ENGINE

[75] Inventor: Etienne Fage, Jouy-en-Josas, France

[73] Assignee: Societe ASTECH, Meudon la Foret, France

[21] Appl. No.: 300,989

[22] Filed: Sep. 10, 1981

[30] Foreign Application Priority Data

Nov. 27, 1980 [FR] France ............................. 80 25168

[51] Int. Cl.² ........................................... B64D 33/04
[52] U.S. Cl. .................................. 244/110 B; 60/230;
60/39.09; 244/113; 92/26; 239/265.29;
239/265.33
[58] Field of Search .......................... 244/110 B, 113;
239/265.29, 265.33, 265.37; 60/229, 230, 226 A,
39.09 R; 92/138, 108, 26

[56]  References Cited
U.S. PATENT DOCUMENTS 2,790,424  4/1957  Giladett ........................ 60/39.09 R
3,086,360  4/1963  Gavin ................................... 60/229
4,212,442  7/1980  Fage .............................. 239/265.29

Primary Examiner—Trygve M. Blix
Assistant Examiner—Ivy Shum
Attorney, Agent, or Firm—Merriam, Marshall & Bicknell

[57]  ABSTRACT

The invention relates to a thrust reverser for the jet engine of an aircraft. According to the invention, the unlocking of the doors with a view to passage from their folded position to their extended position, is effective only after they have been previously brought into a super-retracted position with respect to the folded position and said reverser comprises stops which allow the doors to pass from the folded position to the super-retracted position only when the rpm of said engine is lower than a threshold close to idling rpm. The invention is particularly applicable to ensuring operational safety of thrust reversers.

5 Claims, 10 Drawing Figures

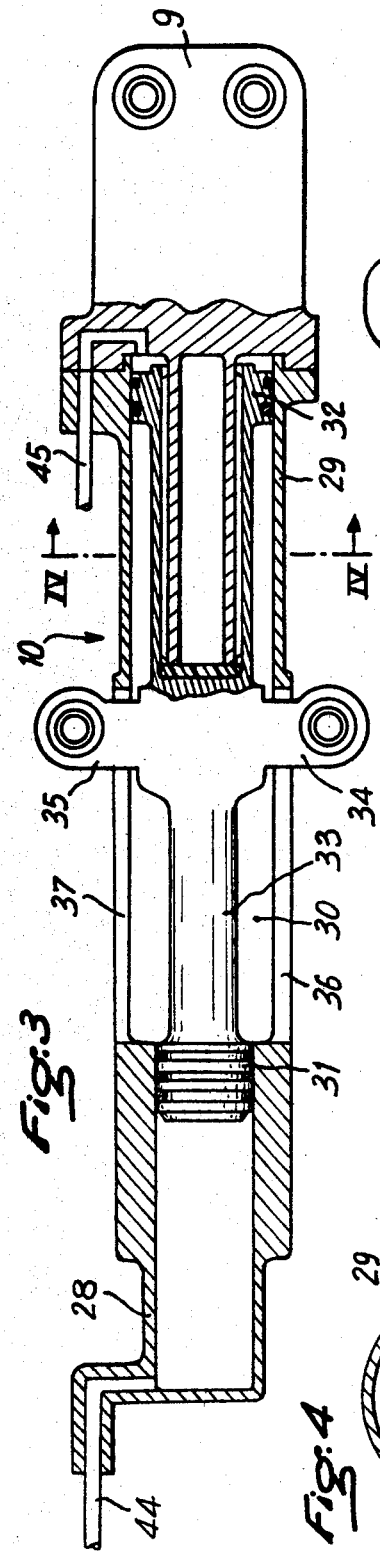
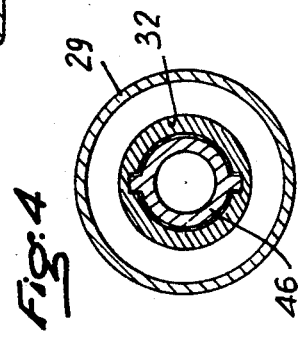
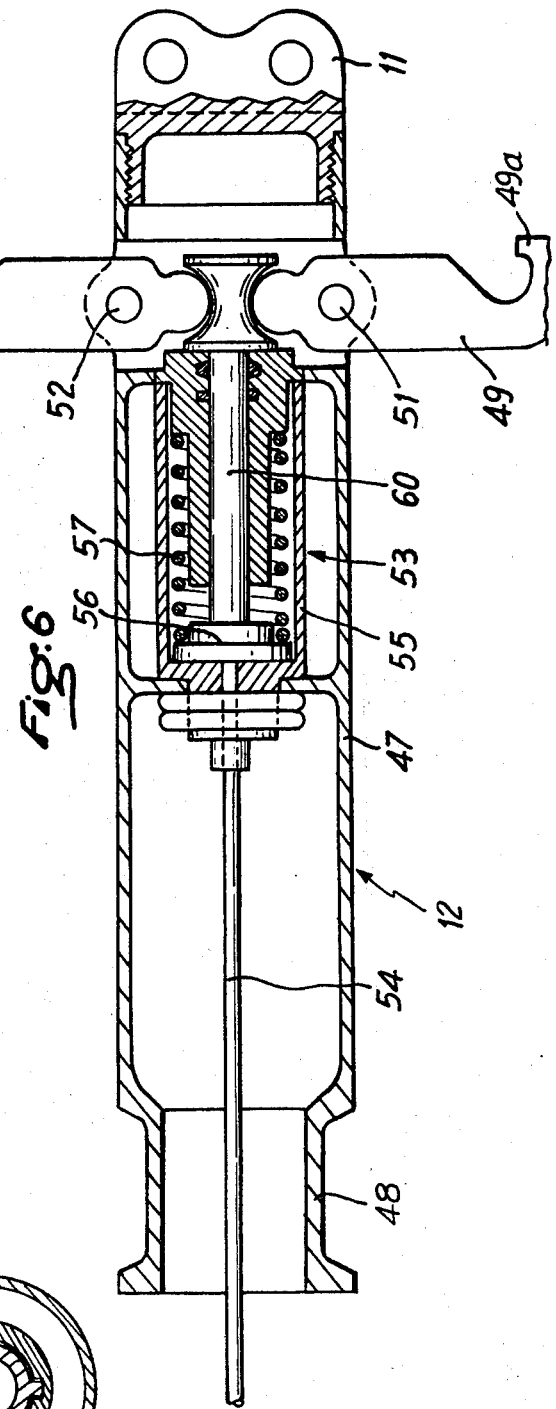

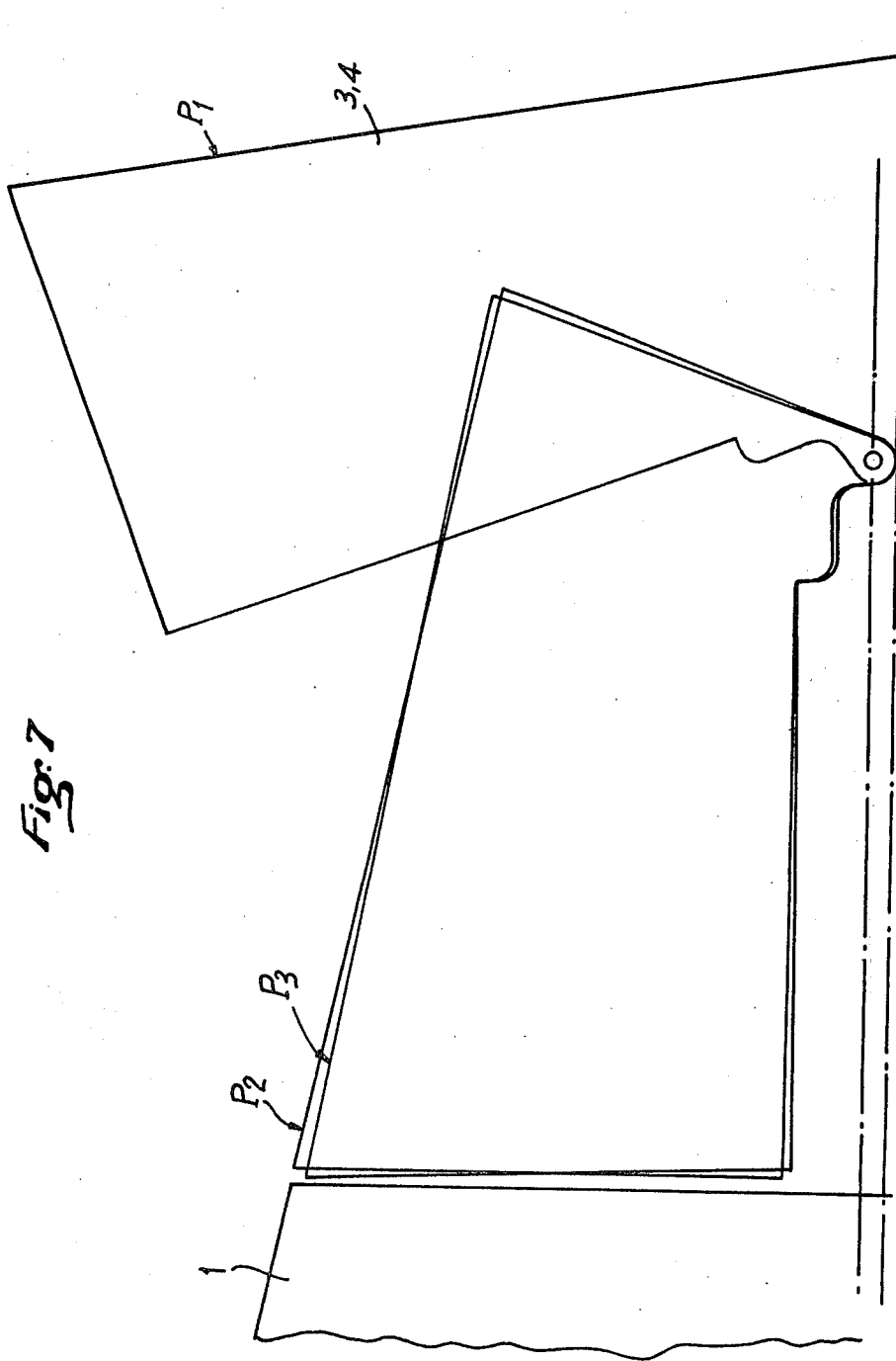

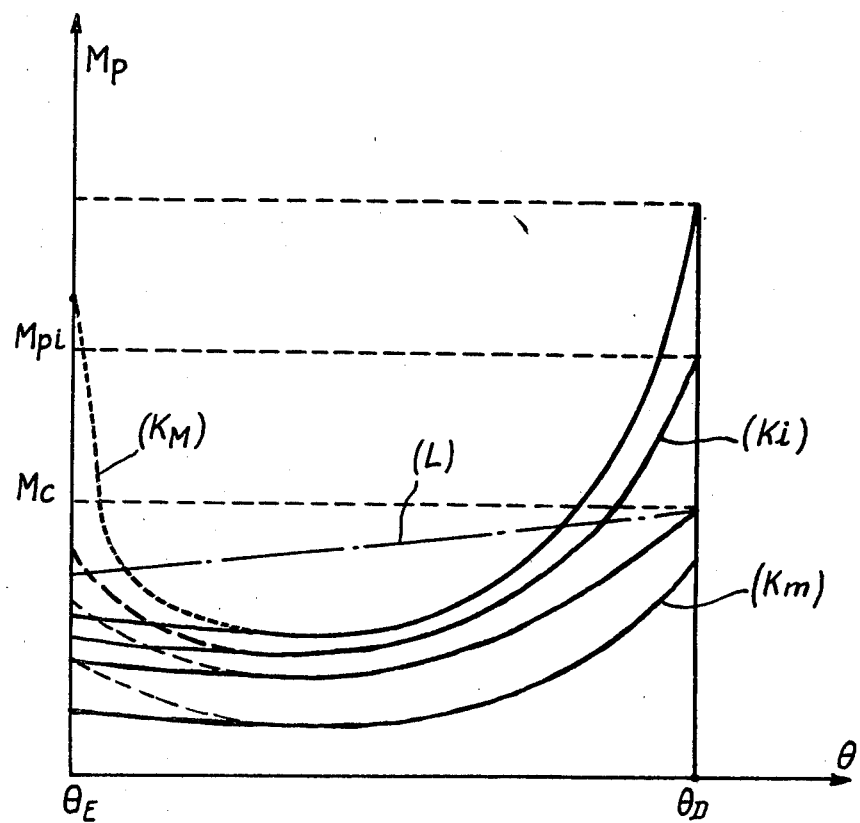

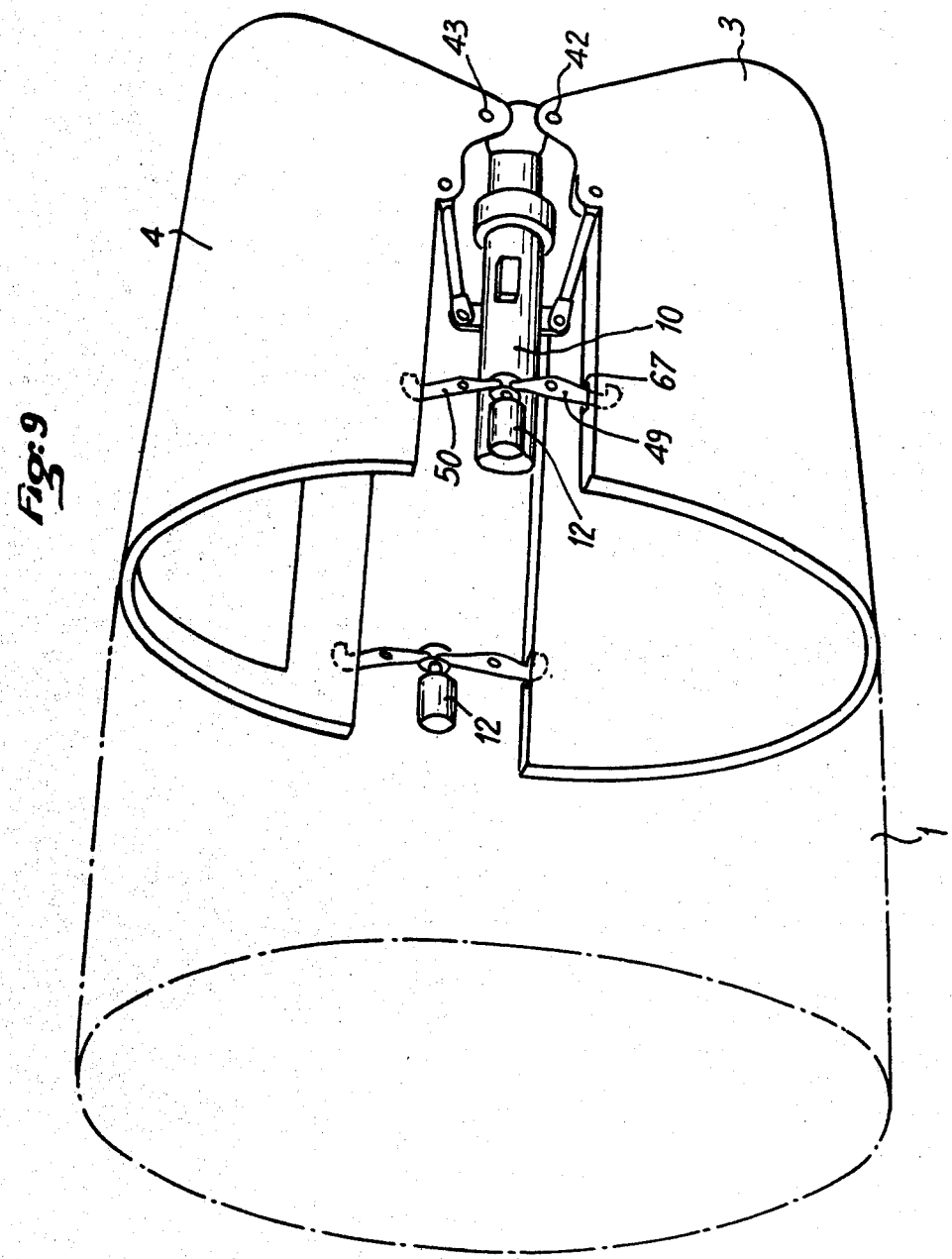

REVERSER FOR JET ENGINE

The present invention relates to a thrust reverser for a jet engine, with or without by-pass of the main jet, mounted in particular on an aircraft.

In order to shorten the stopping distance of an aircraft or to increase safety when braking on a damp or icy runway, it is known to use a jet reverser which produces a braking thrust, on aircraft provided with jet engines.

To this end, thrust reversers are already known which comprise at least one door mounted to pivot about an axis which is transverse and substantially diametrical with respect to the jet of said engine and which is disposed downstream of the exhaust nozzle thereof, said door being adapted to occupy a folded position in which it forms a part of the fairing of said engine or of the fuselage of the aircraft or an extended position in which it is disposed transversely with respect to said jet.

In these known thrust reversers, the or each door is mounted to pivot via two diametrically opposite hinge elements and are controlled by at least one longitudinal jack acting on said hinges. Of course, the jack control and monitoring systems, making it possible to pass, as desired, from the "direct jet" to "reversed jet" position, are particularly designed to present as low a breakdown rate as possible. However, whatever the value of this rate, official safety regulations rightly impose that the maker demonstrates by tests that a possible poor functioning does not cause a catastrophic situation for the aircraft. On the one hand, an accidental passage into reverse thrust when the aircraft is in normal flight and, on the other hand, an accidental passage into direct thrust when the aircraft is braking due to its thrust reversers must therefore be demonstrated. These demonstrations, which are always delicate, may lead to modifications being made to the aircraft in question and to the introduction of additional safety systems, such as a system for automatically reducing the gas in the event of poor functioning of one of the thrust reversers.

It is an object of the present invention to improve the general operational safety of a thrust reverser, by rendering the displacement of its members physically impossible when the engine develops a power substantially greater than the idling.

Under these conditions, any failure in the electrical, hydraulic or pneumatic links in the control chain can never cause a dangerous accidental change in position, since this change can only be made when the engine power is close to idling rpm.

To this end, according to the invention, the thrust reverser for jet engine of an aircraft, comprising at least one door mounted to pivot about an axis which is transverse and substantially diametrical with respect to the jet of said engine and which is located downstream of the exhaust nozzle thereof, said door being hinged via two diametrically opposite hinges and being adapted to occupy a folded position in which it forms part of the fairing of said engine or of the fuselage of the aircraft or an extended position in which it is disposed transversely with respect to said jet, this control device comprising at least one longitudinal jack for controlling said door via connecting rods and at least one locking device being provided to lock said door in folded position, wherein the unlocking of said door by said locking device, for the purpose of passing from its folded position to its extended position, is effective only after said door has been previously brought into a super-retracted position with respect to the folded position, and said reverser comprises at least one stop which allows the door to pass from the folded position to super-retracted position only when the rpm of said engine is lower than a threshold close to idling rpm.

Thus, the doors can pass from their folded position to their extended position only after having passed through their super-retracted position and this super-retracted position can only be reached if the rpm of the engine is clearly less than that corresponding to normal flight. It is therefore impossible for the doors of the reverser to open accidentally during flight, unless the rpm of the engine is sufficiently reduced.

In the event of the locking device comprising a jack for actuating a pivoting hook adapted to hook behing part of said door, it is advantageous if this hook comprises at its end a safety extension or tooth, preventing unlocking of the door in folded position before passage through the super-retracted position.

Said stop may comprise a cylinder-piston assembly connected to a pressure inlet for the gas of the engine, so that the position and/or the force of reaction of the piston in the cylinder is a function of the rpm of said engine. The actual stop may then be formed by a rod fast with the piston and projecting outside the cylinder. An antagonistic spring may be provided inside said cylinder to act on the piston in the direction opposite the corresponding reverser door.

In the event of the reverser door being subjected, in folded position, to an action of the gas of the engine which tends to push it outwardly, i.e. to open it, the stop may be a simple elastic stop. Thus, when the rpm of the engine is higher than said threshold, it is the combined action of the elastic stop and the exhaust gases of the engine which prevents passage into super-retracted position. When the rpm of the engine drops below said threshold, the action of the exhaust gas of the engine on the doors diminishes and the elastic stops are no longer sufficiently rigid to oppose the passage into super-retracted position alone.

Furthermore, according to another feature of the present invention, to avoid the risk on untimely folding of the reverser door when it is in extended position and is exerting its braking action on the aircraft, the power of the jack controlling opening of the door and the linkage of this jack are selected so that, when the door is in extended position and for a determined engine rpm higher than idling rpm, the moment, with respect to the hinge of said door, of the aerodynamic forces exerted thereon by the jet of the engine, is greater than the moment of retraction capable of being exerted by said jack.

The invention will be more readily understood on reading the following description with reference to the accompanying drawings, in which:

FIG. 3 is a schematic longitudinal section of the jack of FIG. 2.

FIG. 4 is a transverse section along line IV—IV of FIG. 3 illustrating the anti-rotation mechanism of the double piston.

FIG. 6 is a schematic longitudinal section through the hydraulic locking device of FIG. 5.

FIG. 7 schematically illustrates the different positions which may be taken by the doors of the thrust reverser.

FIG. 8 is a diagram illustrating the functioning of the control device according to the invention.

FIG. 9 schematically illustrates, in perspective, a variant embodiment of the control device according to the invention.

Figure 10:
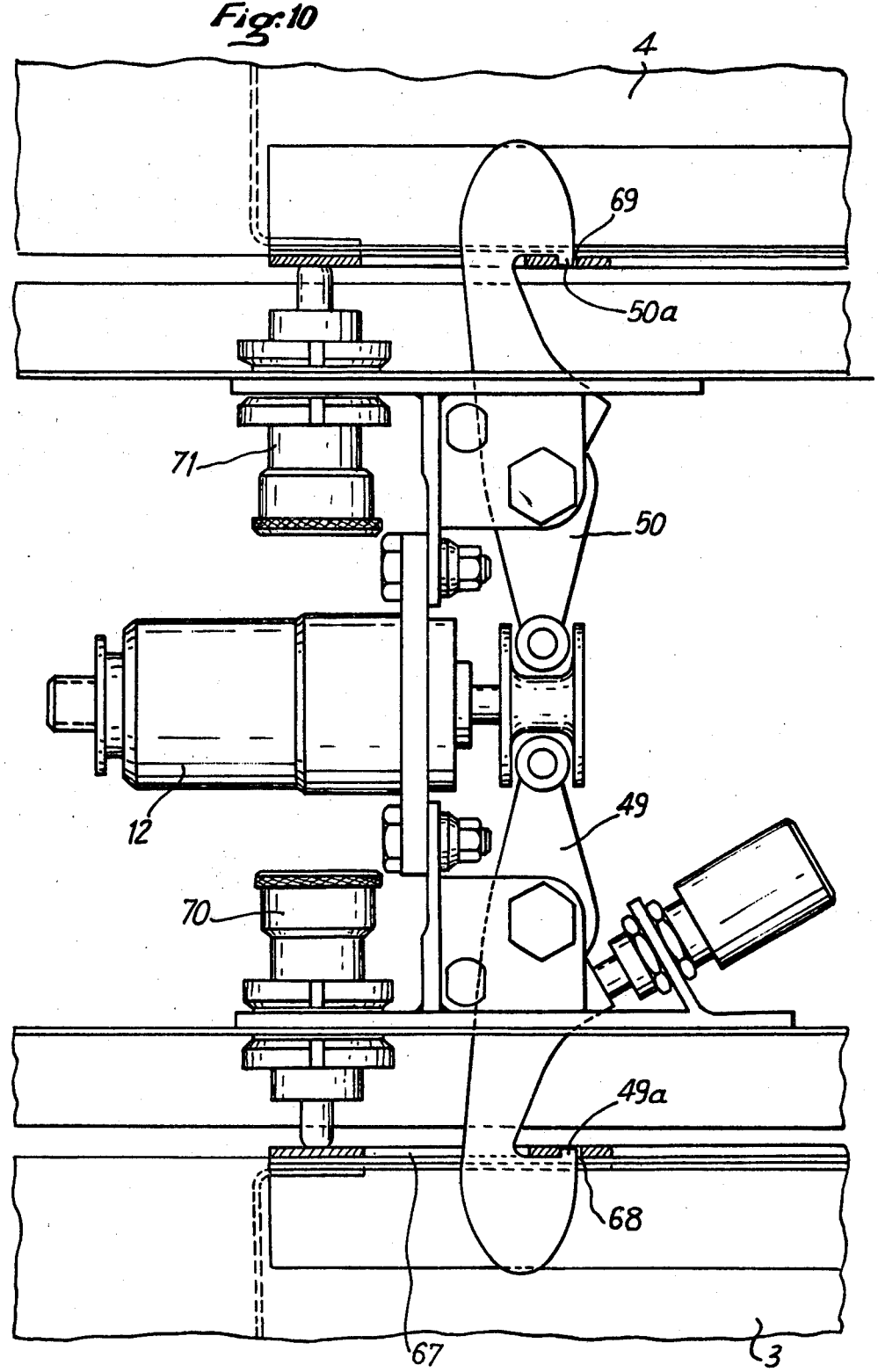

FIG. 10 shows, to a larger scale, the locking device of the device of FIG. 9.

In these Figures, like references denote like elements.

Figure 1:
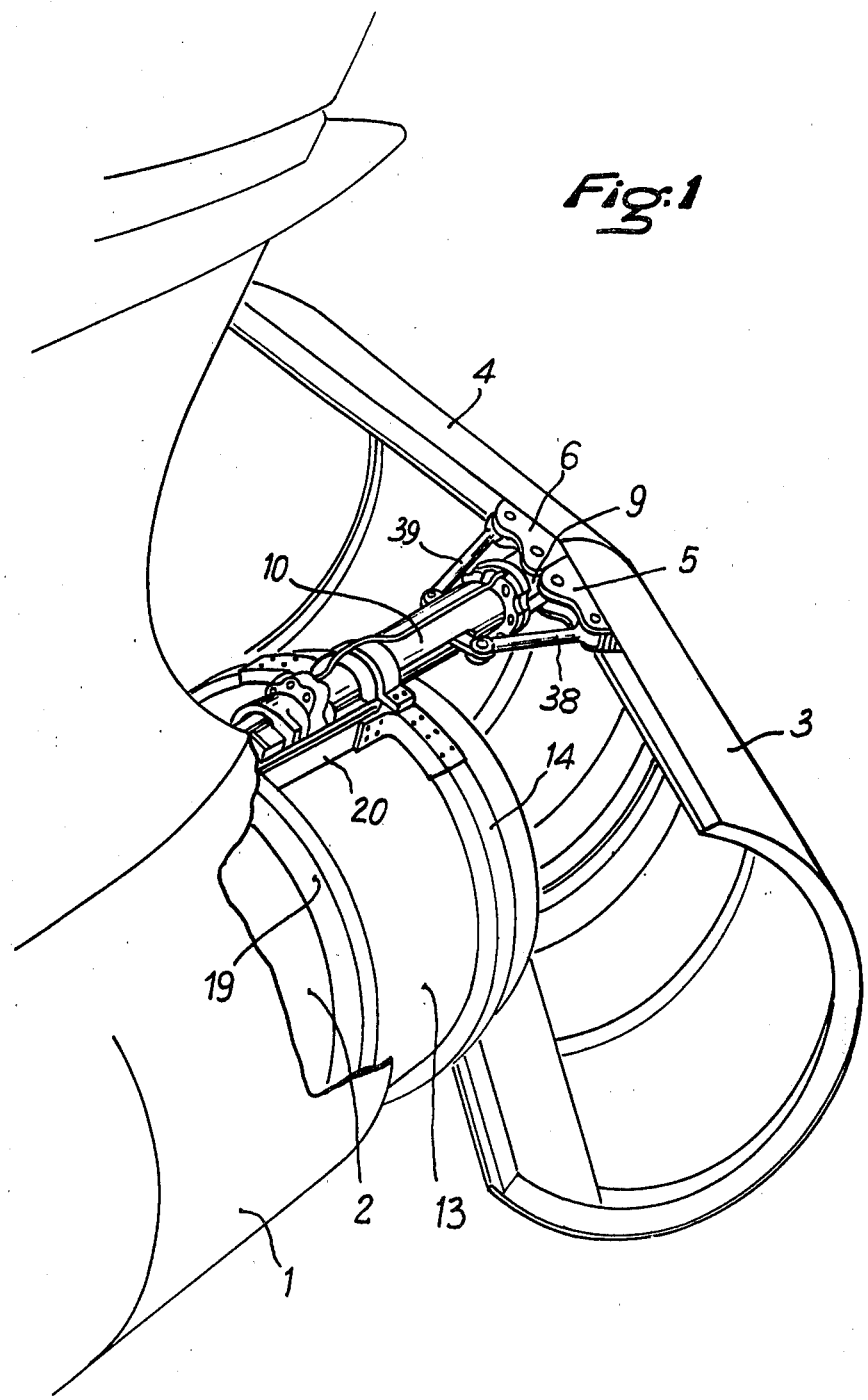
FIG. 1 shows in perspective the rear part of an aircraft, with central engine, provided with a thrust reverser.

Referring now to the drawings, the rear part 1 of an aircraft, shown in perspective in FIG. 1, comprises a central engine 2 provided with a thrust reverser comprising two identical reverser doors 3 and 4, articulated about a vertical axis disposed downstream of the fan nozzle of the engine 2. To this end, the reverser doors 3 and 4 comprise in their upper part hinge fittings 5 and 6 respectively and, in their lower part, hinge fittings 7 and 8 respectively.

The upper hinge fitting 5 and 6 of the doors 3 and 4 are hinged at the rear end 9 of the body of a double-bodied hydraulic control jack 10 whilst the lower hinge fittings 7 and 8 of said doors are hinged at the rear end 11 of a hydraulic locking device 12. The control jack 10 and the locking device 12 are diametrically opposite each other and they are fixed on the fan duct 13 of the engine 2. To this end, the rear frame 14 of this fan duct comprises an upper attachment fitting 15, with cap 16, for fixing the control jack 10 and an upper attachment fitting 17, with cap 18, for fixing the locking device 12. In this way, the control jack 10 and the locking device 12 are directly mounted on the rear frame 14. Moreover, the fittings 15 and 17 are also fixed to the frame 19 preceding the frame 14, via longitudinal elements 20,21 and 23,23 respectively.

The rear ends 9 of the jack body 10 and 11 of the locking device 12 may thus respectively act as upper and lower pivot support for gates 3 and 4, with respect to the fan duct 13.

The hinge fittings 5 and 6 are hinged on the rear end 9 of the body of the jack via pins 24 and 25 respectively, whilst the hinge fittings 7 and 8 are hinged on the rear end 11 via pins 26 and 27, respectively.

FIG. 3 illustrates the structure of the control jack 10. The latter comprises two distinct cylinders 28 and 29 which are aligned, but spaced apart from each other, and connected by a sleeve 30. The bodies of the cylinders 28,29 and the sleeve 30 are fast with one another and may be in one piece.

Pistons 31 and 32 are respectively arranged inside the cylinders 28 and 29. The pistons 31 and 32 are made fast with each other by a common intermediate piston rod 33, comprising diametrically opposite fastening lugs 34 and 35, passing through the side wall of the sleeve 30 through longitudinal slots 36 and 37.

Figure 2:
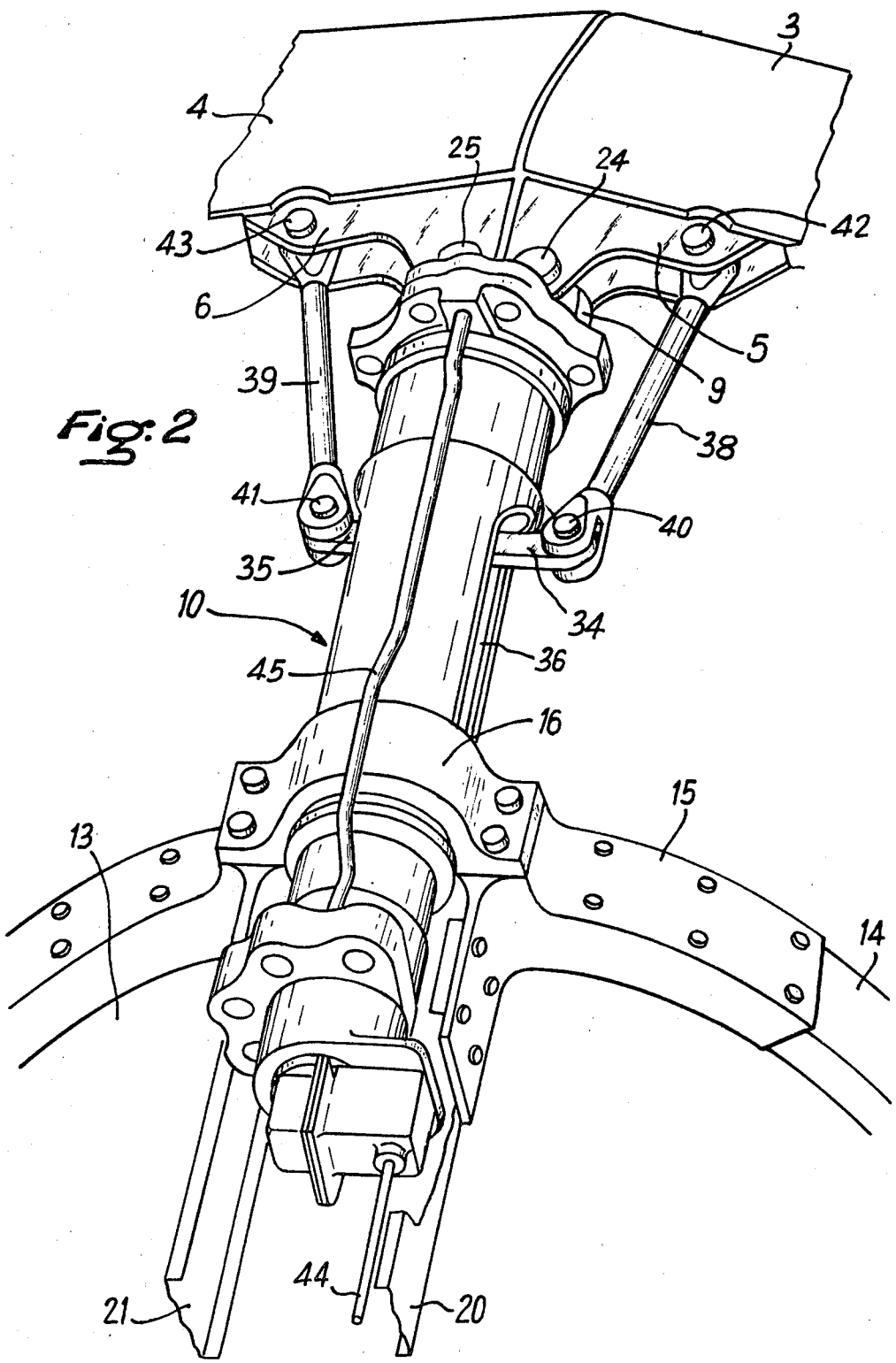
FIG. 2 shows, in perspective plan view, a jack for controlling the doors of the reverser.

Connecting rods 38 and 39 respectively are articulated on the fastening lugs 34 and 35 via pins 40 or 41 (cf. FIG. 2).

At their ends opposite the lugs 34 and 35, the connecting rods 38 and 39 are articulated on the upper hinge fittings 5 and 6 respectively by means of pins 42 and 43.

Hydraulic fluid is admitted into and exhausted from the cylinders 28 and 29 via pipes 44 and 45, opening in that part of said cylinders opposite the intermediate piston rod 33.

When pipe 44 is connected to a source of hydraulic fluid under pressure, whilst the conduit 45 is connected to exhaust (situation shown in FIG. 3), the piston 31-piston rod 33-piston 32 assembly moves towards the right in FIG. 3 and the connecting rods 38 and 39 force the doors 3 and 4 to open out and take the position shown in FIG. 1 and indicated by $P_1$ in FIG. 7. In extended position, the doors 3 and 4 may be locked by a mechanical device (not shown).

Inversely, when the conduit 45 is connected to the source of hydraulic fluid under pressure, whilst the conduit 44 is connected to exhaust, the piston 31-piston rod 33-piston 32 assembly moves towards the left in FIG. 3 and the connecting rods 38 and 39 return the doors 3 and 4 into position folded along the fan duct 13. In fact, in this folded position controlled by the jack 10, the doors 3 and 4 may take either a normal retracted position, designated by $P_2$ in FIG. 7, in which the section of said doors continues that of part 1, or a super-retracted position designated by $P_3$ in FIG. 7, in which the section of said doors is recessed with respect to the fairing of the rear part 1.

To avoid the assembly 31,32,33 rotating with respect to the assembly 28,29,30, the piston rod 32 comprises a coaxial bore in which penetrates a cylindrical projection 46 fast with the assembly 28,29,30 and said bore and projection are provided with cooperating longitudinal grooves and ribs (cf. FIG. 4).

Figure 5:
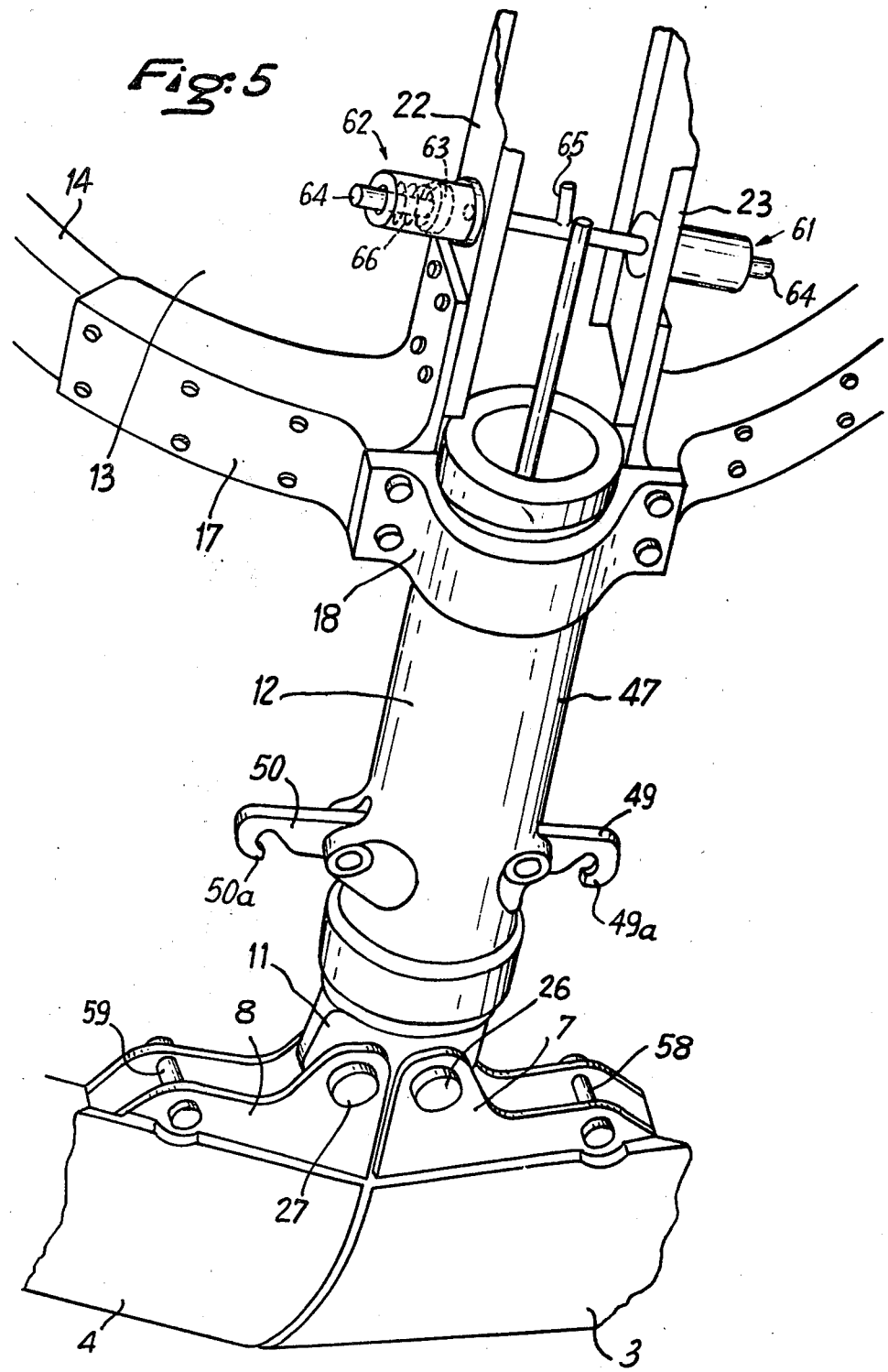
FIG. 5 shows, in perspective from beneath, a hydraulic locking device according to the invention.

FIGS. 5 and 6 illustrate the device 12 for hydraulically locking the doors 3 and 4 in folded position.

This locking device 12 comprises a cylindrical body 47 whose dimensions are similar to those of the assembly 28,29,30 and at the free end of which is located the end 11 on which doors 2 and 3 are articulated. At its other end, the cylindrical body 47 comprises a shoulder 48 adapted to cooperate with the cap 18 of the attachment fitting 17. On the body 47 are articulated two diametrically opposite side hooks 49 and 50 provided with safety teeth 49a and 50a, respectively, at their end. They may pivot about axes 51 and 52, at right angles to the longitudinal direction of the body 47. Inside the latter is housed a hydraulic jack 53 adapted to be supplied by a pipe 54. The cylinder 55 of the jack 53 is fixed with respect to the body 47, whilst the piston 56 is loaded by a spring 57. When the doors 3 and 4 are folded, the hooks 49 and 50, under the action of the spring 57, are in mesh with pins 58 and 59, fast with the hinge fittings 7 and 8, respectively, and thus locking said doors in folded position.

The piston 56 is fast with a piston rod 60, in mesh with the teeth of the hooks 49 and 50. When a hydraulic fluid is admitted in the pipe 54, the piston 56 is pushed against the action of the spring 57 (towards the right in FIG. 6) and the hooks 49 and 50 tend to tip in such a way as to release the pins 58 and 59. If, at that moment, the doors 3 and 4 are in super-retracted position $P_3$, under the action of the jack 10, the hooks 49 and 50 then tip and release said pins 58 and 59. The doors 3 and 4 may then be opened out by action of said jack 10, to bring them into extended position $P_1$. On the other hand, if, at the moment when hydraulic fluid enters in the pipe 54, the doors 3 and 4 are in normal retracted position $P_2$, then the hooks 49 and 50 cannot tip, despite the order that they receive, as, in this case, the safety teeth 49a and 50a hook behind the pins 58 and 59 and oppose opening of the doors 3 and 4.

When the doors 3 and 4 are folded, the pins 58 and 59 clip automatically behind the hooks 49 and 50 and their respective tooth 49a and 50a.

Furthermore, on the longitudinal elements 22 and 23 are provided two opposite stops 61 and 62, respectively adapted to cooperate with the doors 3 and 4. Each of the stops 61 and 62 forms a cylinder in which is disposed a piston 63 provided with a piston rod 64, projecting outwardly in the direction of the corresponding door 3 or 4. The pistons 63, and therefore their piston rod 64, are pushed towards the outside (in the direction of doors 3 and 4) by the pressure of the gas of the engine applied on one of their faces via a pressure inlet 65 and towards the inside (in the direction opposite that of the doors 3 and 4) by the action of a spring 66.

The force of the springs 66 and the length of the rods 64, as well as the power of the control jack 10 in super-retracted position are provided as a function of the characteristics of the engine on which the reverser according to the invention is mounted so that, as long as the rpm of said engine is higher than a predetermined threshold lower than normal flight speed, the rods 64 project sufficiently outwardly to serve as stop preventing the doors 3 and 4 from being able to pass from their retracted position $P_2$ to their super-retracted position $P_3$, even if the jack 10 is controlled in this sense.

Thus, if the rpm of the engine is higher than the predetermined threshold, it is impossible to over-retract the doors 3 and 4 and therefore to unlock them. The stops 61 and 62, associated with the safety teeth 49a and 50a, therefore constitute a locking device preventing any accidental opening of the doors 3 and 4. In fact, an accidental order to unlock the doors 3 and 4, received by the jack 12, can be effective only if said doors were previously moved from their retracted position $P_2$ to their super-retracted position $P_3$, i.e. if the stops 64 were sufficiently retracted, this meaning that the engine is then at idling rpm.

The risk of the doors 3 and 4 being accidentally open in normal flight is therefore impossible: on the one hand, such an accidental opening would require the highly unlikely coincidence of accidental orders for unlocking and super-retraction and opening of said doors and, on the other hand, even if such a coincidence existed, it could not have any effect due to the stops 61 and 62.

FIG. 8 shows (solid line curves) the development of the moment $M_P$ of the aerodynamic forces, applied to a gate 3 or 4, about a corresponding axis 24 or 25, during opening of said doors and as a function of the angle of opening $\theta$. The development of this moment $M_P$, between the angle of opening $\theta_E$ corresponding to the retracted position $P_2$, and the angle of opening $\theta_D$ corresponding to the extended position $P_1$, is shown by a curve which is generally representative of the fact that the doors 3 and 4 tend, under the action of the aerodynamic forces, to remain completely extended, all the more so as the rmp of the engine is higher. At maximum rpm, the development of $M_p$ will be shown by the curve $K_M$, whilst at idling rpm, the evolution of $M_p$ will be shown by curve $K_m$. To each intermediate rpm of the engine there corresponds a curve $(K_i)$ included between $(K_m)$ and $(K_M)$. Furthermore the control jack 10, associated with its linkage 38,39,42,43 presents a moment which is substantially rectilinear but increasing between $\theta_E$ and $\theta_D$, shown in FIG. 8 by the straight line (L), and leading to a maximum moment $M_C$ when the doors 3 and 4 are in extended position.

Thus, if the thrust reverser device is functioning normally (doors extended in position $P_1$), it will naturally remain extended for any rpm of the engine creating, for the angle of opening $\theta_D$, a moment of opening $M_{pi}$ greater than the maximum value $M_c$ which may be developed by the jack 10 and its linkage 38,39,42,43, whatever the failure of the control system. Thus, by suitably choosing the power of the jack 10 and the position of the pivots 42 and 43, the impossibility can be guaranteed of an accidental retraction of the doors 3 and 4 from the extended position $P_1$ to the folded position $P_2$, not only for high powers of the engine, but also for any power of the engine greater than the one, close to idling rmp, which, in the event of sudden breakdown, might produce a force and a disturbing torque dangerous for the piloting of the aircraft.

In the embodiment of FIGS. 1 to 6, it has been assumed that there was only one control jack 10 and one locking jack 12, diametrically opposite each other. It is obvious that several control jacks 10 and/or several locking jacks 12, arranged otherwise, may be provided. For example, FIG. 9 shows a thrust reverser device comprising one control jack 10 and two locking jacks 12. The two jacks 12 are diametrically opposite each other, one of them being mounted on jack 10.

As shown in FIGS. 9 and 10, the hooks 49 and 50 may pass through openings 67 in the wall of the doors 3 and 4 to hook inside same, a special housing 68 or 69 being provided for the safety teeth 49a and 50a.

Furthermore, in certain thrust reverser structures, for example the one described in U.S. Pat. No. 4,182,501, the reverser doors undergo, in folded position, an effort of differential pressure which is a function of the rpm of the engine and which tends to push said doors into open position, therefore opposing passage into super-retracted position $P_3$. In this case, the development of the curves (Ki) near the angle $\theta_E$ is represented by the portions in broken lines and no longer by the portions in solid lines (cf. FIG. 8) and the stops with piston 61 and 62 supplied by the pressure of the gases of the engine, are no longer necessary and may be replaced by simple elastic stops 70 and 71, as shown in FIG. 10.

Thus, the elastic stiffness of said stops 70 and 71 may be suitably chosen for the action thereof, combined with that of the pressure exerted by the gases of the engine on the doors to prevent passage into super-retracted position, as long as the rpm of said engine is higher than said predetermined threshold, but, when said pressure of the gases has disappeared or sufficiently decreased due to the fact that the rpm of the engine is below said threshold, for said elastic stops not to be sufficiently strong, alone, to oppose super-retraction of the doors.

What is claimed is:

1. In a thrust reverser for a jet engine of an aircraft comprising at least one door mounted to pivot about an axis which is transverse and substantially diametrical with respect to the jet of said engine and which is located downstream of the exhaust nozzle thereof, said door being pivotable between a folded position in which it is clear of, said jet and an extended position in which it is arranged transversely with respect to said jet, and a control device for controlling the position of said door, said control device including at least one longitudinal jack and at least one connecting rod interconnecting said jack and said door, the improvement comprising:

at least one locking device adapted to lock said door in folded position, said locking device being effective to unlock said door to permit passage from its folded position to its extended position only after said door has been brought into a super-retracted position with respect to said folded position, and at least one stop means which allows said door to pass from said folded position to said super-retracted position only when the power output of said engine is lower than a predetermined threshold valve close to idling.

2. The thrust reverser of claim 1, in which the locking device comprises a jack for actuating a pivoting hook adapted to hook behind part of said door, wherein said hook comprises at its end a safety extension or tooth, preventing unlocking of the door in folded position before passage through the super-retracted position.

3. The thrust reverser of claim 1, wherein said stop means comprises a cylinder-piston assembly operatively connected to be actuated by the pressure of the jet of the engine, so that the actuation of the piston in the cylinder is a function of the power output of said engine.

4. The thrust reverser of claim 1, in which said door is subjected, in folded position, to an action of the jet from the engine tending to push it outwards, wherein the stop is a simple elastic stop.

5. The thrust reverser of claim 1, wherein the maximum retraction moment which can be exerted by said longitudinal jack on said door about said axis, when said door is in extended position, is less than the moment about said axis created by said jet, at all power levels of said engine equal to or greater than said predetermined threshold value.

* * * * *